United States Patent
Koshimizu et al.

(10) Patent No.: US 6,522,862 B2
(45) Date of Patent: Feb. 18, 2003

(54) COMPACT IMAGE FORMING APPARATUS WITH VERTICAL ARRANGEMENT

(75) Inventors: Yoshiyuki Koshimizu, Chiba (JP); Naoki Okuda, Chiba (JP); Naomasa Kimura, Ibaraki (JP); Masahiko Yashiro, Ibaraki (JP); Hiroaki Miyake, Ibaraki (JP); Masaaki Saito, Tokyo (JP); Masakazu Mori, Ibaraki (JP); Hideki Mori, Ibaraki (JP); Takahiro Terao, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/833,590

(22) Filed: Apr. 13, 2001

(65) Prior Publication Data

US 2001/0031162 A1 Oct. 18, 2001

(30) Foreign Application Priority Data

Apr. 18, 2000 (JP) ........................................ 2000-116500

(51) Int. Cl.⁷ .............................................. G03G 15/00
(52) U.S. Cl. ......................... 399/405; 399/362; 399/367
(58) Field of Search ................... 399/107, 362, 399/367, 397, 403, 405, 407, 408; 271/279, 287, 292, 294

(56) References Cited

U.S. PATENT DOCUMENTS

| | | | | |
|---|---|---|---|---|
| 4,763,892 A | * | 8/1988 | Tanaka et al. | 271/294 X |
| 4,857,963 A | * | 8/1989 | Sutou | 399/397 X |
| 4,873,547 A | | 10/1989 | Sasaki et al. | |
| 5,204,727 A | * | 4/1993 | Haneda et al. | 399/405 |
| 5,416,570 A | * | 5/1995 | Kondou | 399/367 |
| 5,905,934 A | | 5/1999 | Koshimizu | 399/396 |
| 5,918,876 A | | 7/1999 | Maruyama et al. | 271/228 |
| 6,304,742 B1 | * | 10/2001 | Nunes et al. | 399/367 X |

\* cited by examiner

Primary Examiner—Sandra Brase
(74) Attorney, Agent, or Firm—Fitzpatrick, Cella, Harper & Scinto

(57) ABSTRACT

An image forming apparatus has a sheet support for accommodating an image-forming sheet; an image forming unit for forming an image on a sheet; a document reading section having a document placing table for reading image information of the document; an ADF in which a document is feedable to the document reading section and displaceable so as to allow placement of the document onto the document placing table; and a sheet discharging section on which a sheet with an image formed thereon by the image forming unit is discharged and stacked by arranging them in the image forming apparatus from the lower part thereof toward the upper part in order. The image forming apparatus further has a transferring section for transferring a sheet with an image formed thereon to the sheet discharging section which is held movably in the vertical direction.

14 Claims, 15 Drawing Sheets

COMPACT IMAGE FORMING APPARATUS WITH VERTICAL ARRANGEMENT

BACKGROUND OF THE INVENTION

1. Field of the Invention

The present invention relates to an image forming apparatus having image reading means for reading an image and image forming means for forming an image on a sheet and being capable of performing a predetermined processing on the sheet having an image formed thereon.

2. Description of the Related Art

Recently, as there is growing demand for miniaturization of copying machines, a number of copying machines of the type shown in FIG. 14 have been developed.

FIG. 14 is a schematic sectional view of a digital type of copying machine designed for miniaturization. Image information of a document fed to a reading section by ADF 200, which is an automatic document feeder, or a document with a face to be read looking downward and directly placed on a document-placing table by a user is read by optical means at a reader 201. The read image information is converted into an electrical signal (digital signal) by electrical converting means such as an image pick-up element.

The image information converted into an electrical signal is transmitted to a controller (not shown), which is a controller of an image forming section, so that based on the signal, an image is formed on a sheet fed from a paper feeding cassette 204 or a manual paper feeder 205. The image is formed by a known electrophotographic technology such as an image forming unit, (which is a process cartridge 202 for example), conveying means, and fixing means.

The sheet having the image formed thereon is discharged and stacked up in a discharging section 208, which is a space disposed between the image forming section and an image reading section. Since the discharging section, which has been conventionally protruded sideways to the apparatus, can be contained within the space for the image forming apparatus, it has greatly contributed to the miniaturization of the apparatus.

However, improvement in copying productivity has been demanded as well as the miniaturization in a copying machine, so that a processing device 210 (referred to as a finisher below) is developed for sorting, stapling, perforating, and folding the sheet with the image formed thereon. As shown in FIG. 15, such a finisher comprises a finisher conveying section 207 for conveying a sheet from a paper discharging roller 206 to the finisher 210 in a paper discharging section 208 and is placed in the side of the apparatus.

In such a manner, when the finisher is attached to a copying machine intended for miniaturization, the finisher also projects sideways just like the conventional one, so that demands for miniaturization and high copying productivity have not been compatible together.

SUMMARY OF THE INVENTION

In view of the problem, the present invention has been made and it is an object of the present invention to provide an image forming apparatus being compatible with miniaturization of the apparatus and high copying productivity and also having improved usability by a user, and specifically to provide an image forming apparatus capable of improving extractability of a sheet with an image formed thereon and convenience in reading a sheet document and a so-called book document such as a book or a magazine. In accordance with these objects, there is provided an image forming apparatus comprising a sheet supporter for accommodating a sheet on which an image is to be formed; an image former disposed above the sheet supporter for forming an image on a sheet; document reader disposed above the image former having a document placing table on which a document is to be placed for reading image information of the document; an automatic document feeder disposed above the document reader in which a document is feedable to the document reader and which is displaceable so as to open the document placing table of the document reader; and a sheet discharging section on which a sheet with an image formed thereon by the image former is discharged and stacked. As noted, the above components are arranged in the image forming apparatus from the lower part thereof toward the upper part in order, wherein the image former comprises a transferring section for transferring a sheet with an image formed thereon by the image former to the sheet discharging section, and wherein the sheet discharging section is held movably in a vertical direction by the transferring section.

Further objects, features and advantages of the present invention will become apparent from the following description of the preferred embodiments with reference to the attached drawings.

DESCRIPTION OF THE PREFERRED EMBODIMENTS

Figure 1:
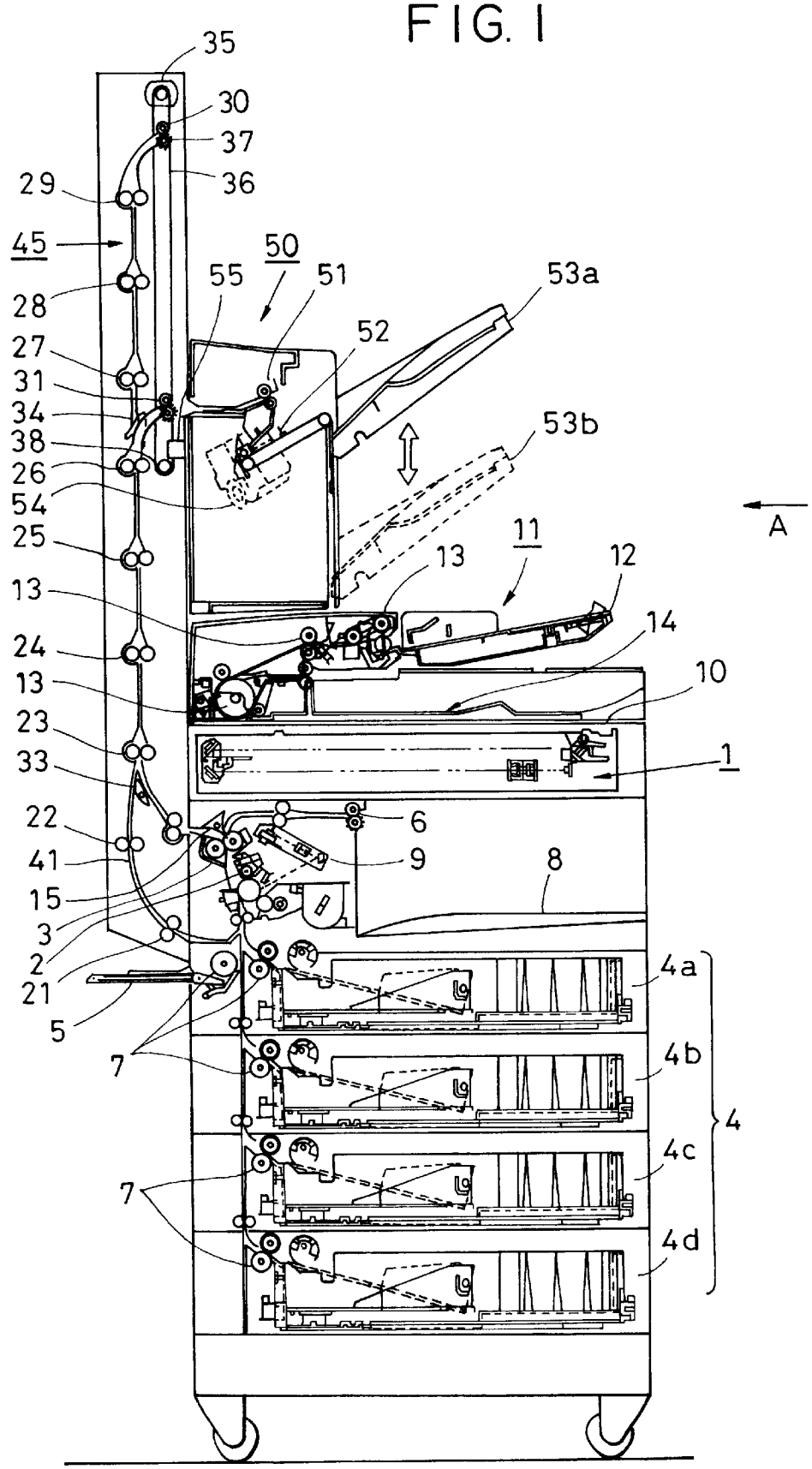
FIG. 1 is a schematic front view of an image forming apparatus according to an embodiment of the present invention.

The present invention will be described in detail by exemplifying a copying machine as an image forming apparatus with reference to the drawings. FIG. 1 is a schematic sectional view, when viewed from the operator side, of a digital copying machine as an image forming apparatus according to a first embodiment of the present invention. The schematic structure of the apparatus will be described below referring to the drawing.

In the lower portion of an apparatus body, there is provided a paper feeding section comprising paper feeding cassettes 4 (4a, 4b, 4c, and 4d) as a sheet supporter for piling and accommodating sheets therein and a paper feeder 7 for feeding a sheet from the paper feeding cassettes 4.

Arbitrary numbers of the paper feeding cassettes are laid up. A manual-feeding-sheet piling unit 5 for manually feeding a sheet having an indeterminate form inadaptable to 5 the paper feeding cassettes 4 and an OHP sheet, etc., is arranged at a position opposing to the paper feeding cassette 4a and projecting toward the body side.

In an upper portion above the paper feeding section of the apparatus body, an image forming section is disposed as an image former for forming an image on a sheet fed from the paper feeding section. The image forming section is formed of a process cartridge 2 for forming an image to be transferred on a sheet, a laser scanner 9 for irradiating a photosensitive drum disposed within the process cartridge 2 with image information, and a pair of fixing rollers 3 as fixing means for fixing a toner image transferred on a sheet by the process cartridge 2. The structure of the process cartridge 2 is known, so that the description thereof is omitted.

A discharging section 8 within the apparatus is disposed in the side of the image forming section and in an upper portion of the paper feeding section as well as a space for discharging and piling sheets having images formed thereon. A sheet having an image fixed thereon by the pair of fixing rollers 3 is discharged to the discharging section 8 within the apparatus by a pair of discharging rollers 6.

In an upper portion above the image former and the discharging section 8 within the apparatus, an image reading section 1 is disposed as a document reading unit for reading document image information. The image reading section 1 has a function that irradiates a document placed on a document-placing table 10 with light and condenses the reflected light by an optical unit such as a mirror or a lens, so that document image information is converted into an electrical signal (digital signal) by a converting unit such as an image pick-up element.

In an upper portion above the document-placing table 10 in the image reading section 1, an automatic document feeder 11 (referred to as an ADF below) is arranged as an automatic document feeder for automatically feeding a document sheet to the document-placing table of the document reading section. The ADF comprises a document tray 12 for placing a document, a document-conveying unit 13 for conveying a placed document, and a document-discharging tray 14 for piling discharged read documents.

The structure, which has been described as above, is identical with that of a conventional digital copying machine. This copying machine is of a digital type, which is becoming mainstream in the recent copying-machine market. This type has not only a so-called copying function but also can be used as a printer, a facsimile, and a scanner by connection to a network, etc. The operation whereby an operator copies a sheet document by using the above structure will be described.

A document required to be copied is placed by an operator on the document tray 12 of the ADF 11. Then, when a start button arranged on a control (not shown) is depressed, an image forming operation is automatically started.

The document placed on the document tray 12 is fed by the document-conveying unit 13. In the image reading section 1 having an optical reading unit, the transferred document is irradiated with light and the reflected light therefrom is caught by an optical system such as a mirror; the caught reflected light is converted into an electrical signal by an image pick-up element such as a CCD. The document, from which image information has been read, is discharged onto the document-discharging tray 14 by the document-conveying unit 13.

On the other hand, in the image forming section and the paper feeding section, the operation for forming an image on a sheet based on the image information, which is read in the ADF 11, is started. From any one of the paper feeding cassettes 4a, 4b, 4c, and 4d, and the manual-feeding-sheet piling unit 5, a sheet is separated one from the other and fed toward the image forming section by the paper feeder 7.

In the image forming section, the photosensitive drum arranged in the process cartridge 2 is uniformly charged. The document image information converted into an electrical signal in the image reading section 1 is written on the charged drum with a laser beam by the laser scanner 9, thereby forming an electrostatic latent image.

Then, toner is attached on the photosensitive drum having a latent image formed thereon so that the latent image is made into a visible image. The visible image is transferred on a fed sheet by a conveying unit. The toner image transferred on the sheet is fixed thereon with heat and pressure on a semipermanent basis by passing the sheet through the pair of fixing rollers 3 as the fixing means.

Afterward, the sheet with an image formed thereon is discharged and stacked onto the discharging section 8 within the apparatus facing the document face downward by the pair of discharging rollers 6.

Next, a sheet discharging section, which is a feature of the present invention, will be described in detail. The sheet discharging section is arranged in an upper portion above the image reading section 1, as shown in FIG. 1. A finisher 50 as a sheet processing unit in the sheet discharging section is vertically movably supported to a frame of a conveying path 45 which is a conveying section extending in the substantially vertical direction for conveying a sheet to the finisher 50. The vertical movement of the finisher 50 will be described in detail later.

The conveying path 45 is a sheet path connecting the finisher 50 and a conveying path formed in the substantially opposite direction to the discharging section 8 within the apparatus and is linked with a flapper 15 for switching conveying directions disposed in a conveying path in the conveying downstream side of the pair of fixing rollers 3, and comprises plural pairs of rollers so as to convey a sheet.

The conveying path 45 also has a sheet reversing function for forming images on both faces. First, the reversing operation of a sheet will be described.

When the trailing end of a sheet conveyed in the direction of the conveying path 45 by the operation of the flapper 15 for switching conveying directions arrives at the nip of a pair of rollers 23, a reversing flapper 33 is displaced and the pair of conveying rollers 23 is rotated in the reverse direction (the opposite direction to the fisher 50), so that the sheet is fed to a double-sided-copy conveying path 41.

Then, the sheet is sequentially conveyed from a pair of conveying rollers 22 through a pair 21, and the other sheet face, on which no image is formed, is faced to the process cartridge 2 relative to the image forming section, thereby forming images on both faces of the sheet.

Next, the structures of the conveying path 45 and the finisher 50 will be described. The conveying path 45 comprises plural pairs of conveying rollers for conveying a sheet, as mentioned above.

Two openings 32 and 37 are formed for transferring a sheet from the conveying path 45 to the finisher 50 corresponding to the position displacement of the finisher 50. Therefore, a flapper 34 for switching the sheet transferring from one to the other of the openings is arranged and controlled so as to displace it corresponding to the position of the finisher 50.

The finisher 50 comprises finisher conveying rollers 51 for conveying a sheet transferred from relay rollers 30 and 31 disposed in the openings, an adjusting belt 52 for adjusting the conveyed sheet, a processing section 54 for performing a predetermined processing such as stapling and perforating on the sheet adjusted on the adjusting belt 52, and a finisher-discharging tray 53 (53a and 53b) on which the processed sheet is discharged and stacked by the adjusting belt 52.

The finisher-discharging tray 53 is constructed movably relative to the processing section 54 from a position 53a to a position 53b indicated by the broken line.

By the way, the finisher 50 is arranged just above the ADF 11 shown in FIG. 1 so that a sheet discharged onto the finisher-discharging tray 53 is easy to be taken by a user.

Figure 2:
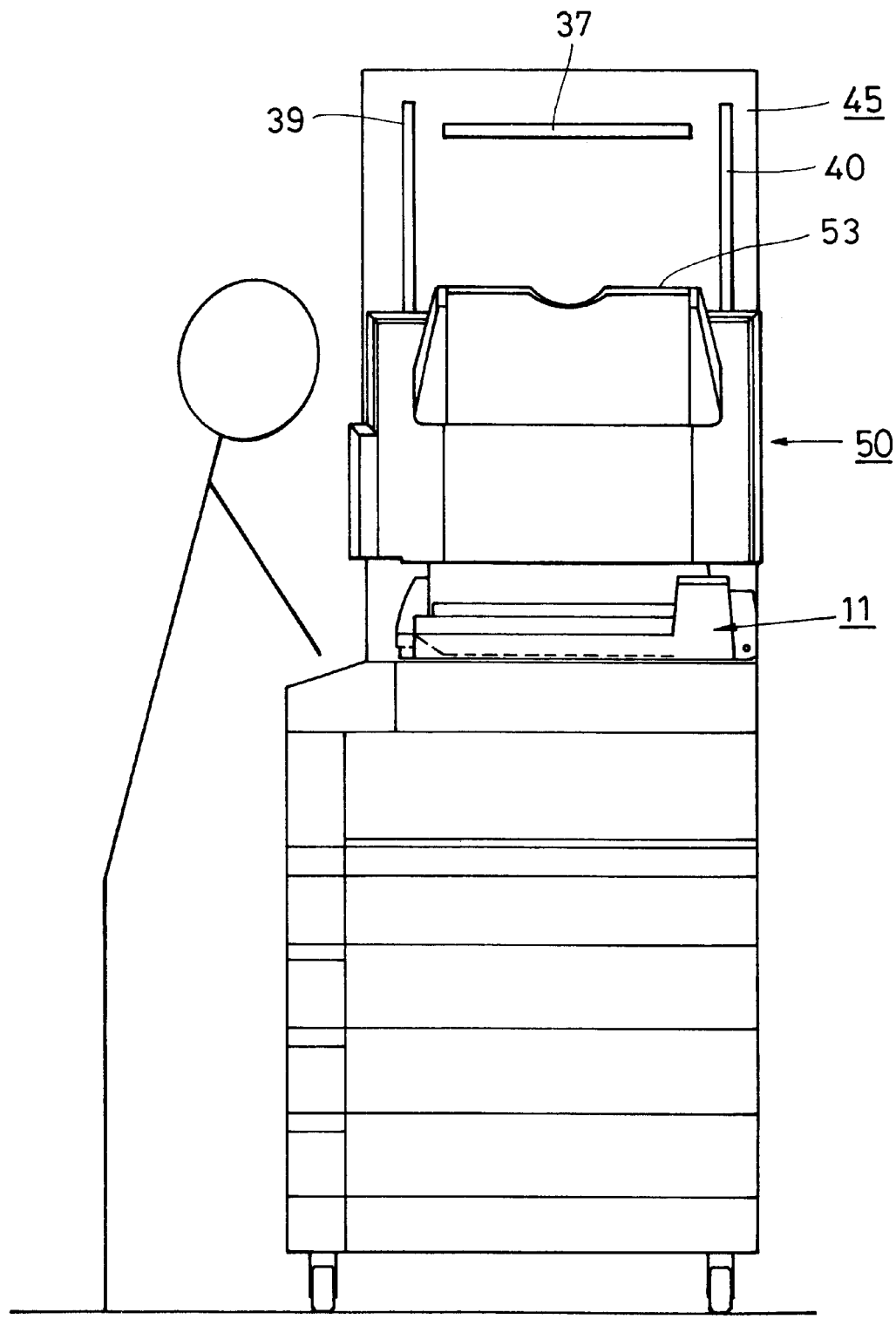
FIG. 2 is a drawing when viewing in the direction A of FIG. 1.

FIG. 2 is a side view of the apparatus when viewing in the direction of the arrow A shown in FIG. 1. When the height of the document-placing table 10 is usually set to be approximately 950 mm from the floor, a general user can easily place a document on the document tray 12 of the ADF 11. Thus even when the finisher 50 is arranged above the document-placing table 10, the height of the finisher discharging tray 53, onto which a sheet with an image formed thereon is discharged, is to be approximately 1350 mm, thereby enabling the sheet to be easily taken out.

In the state shown in FIGS. 1 and 2, when a sheet document is placed on the document tray 12 of the ADF 11, there is no problem because of a sufficient space for the operation of a user between the document tray 12 of the ADF 11 and the finisher-discharging tray 53; however, a thick sheet or a book document such as a book or a magazine is impossible to be fed by the ADF 11, so that the document is required to be placed on the document-placing table 10 by opening the ADF 11 upwardly.

In the state shown in FIGS. 1 and 2, the finisher 50 arranged above the ADF 11 interferes with the opening operation of the ADF 11, so that the ADF 11 cannot be opened so as to open the document-placing table 10.

Accordingly, when the ADF 11 is moved, the finisher 50 is displaced upwardly. The mechanism and operation of the vertical movement of the finisher 50 will be described.

As described above with reference to FIG. 1, in the frame of the conveying path 45, the openings 32 and 37 for transferring a sheet from the conveying path 45 to the finisher 50 are formed. At the very top within the frame of the conveying path 45, a finisher-displacing motor 35 is arranged.

In a lower portion of the opening 32, a rotatable driven pulley 38 is arranged, and a finisher-driving chain 36 is looped and stretched between the finisher-displacing motor 35 and the driven pulley 38.

To the driving chain 36, an arm 55 protruding from the finisher 50 is connected and fixed. The moving direction of the arm 55 is guided with finisher guides 39 and 40 disposed in the conveying path 45 (shown in FIG. 2).

Figure 3:
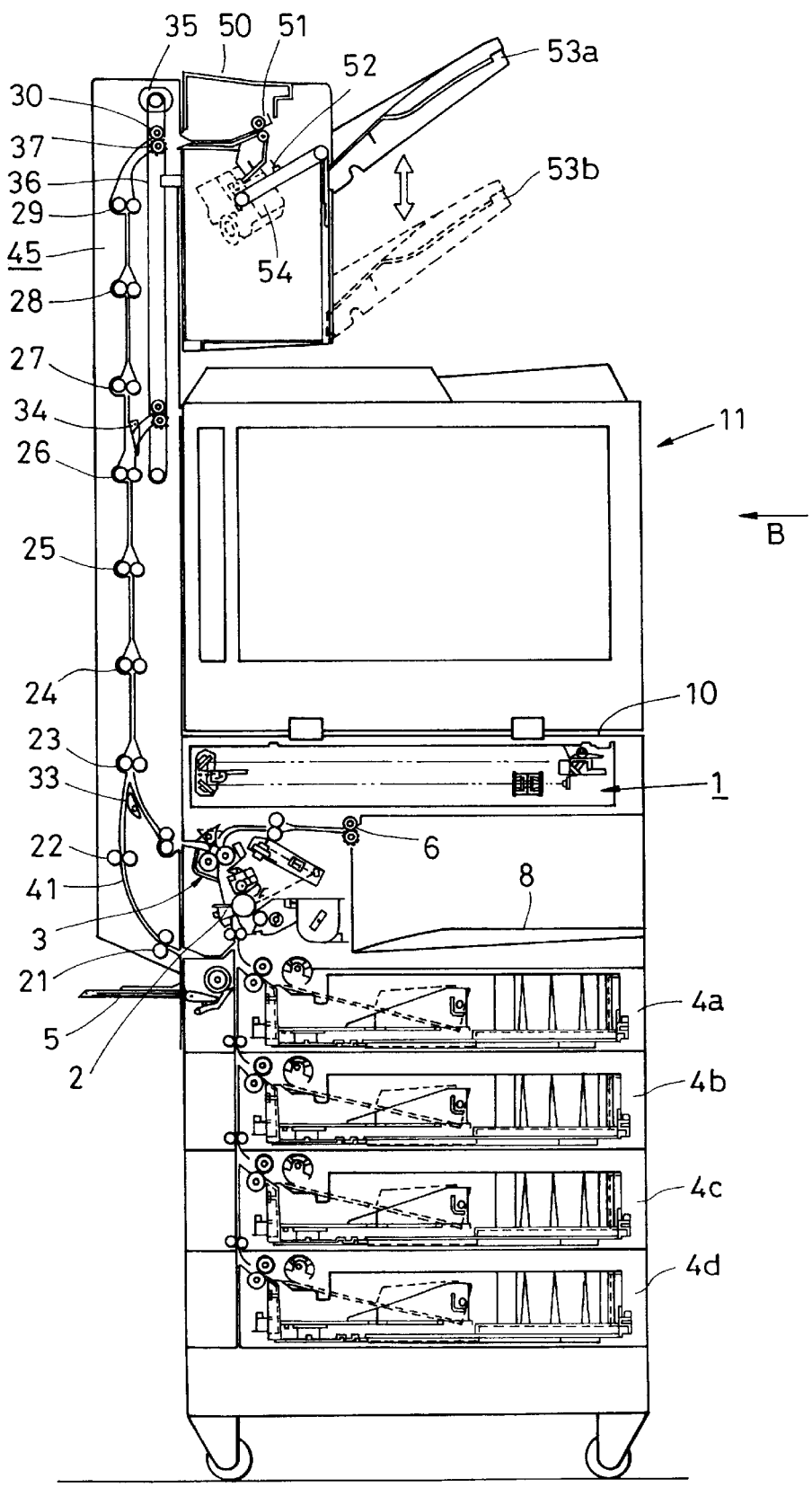
FIG. 3 is a schematic front view of the image forming apparatus according to the first embodiment when using an automatic document feeder therein.
Figure 4:
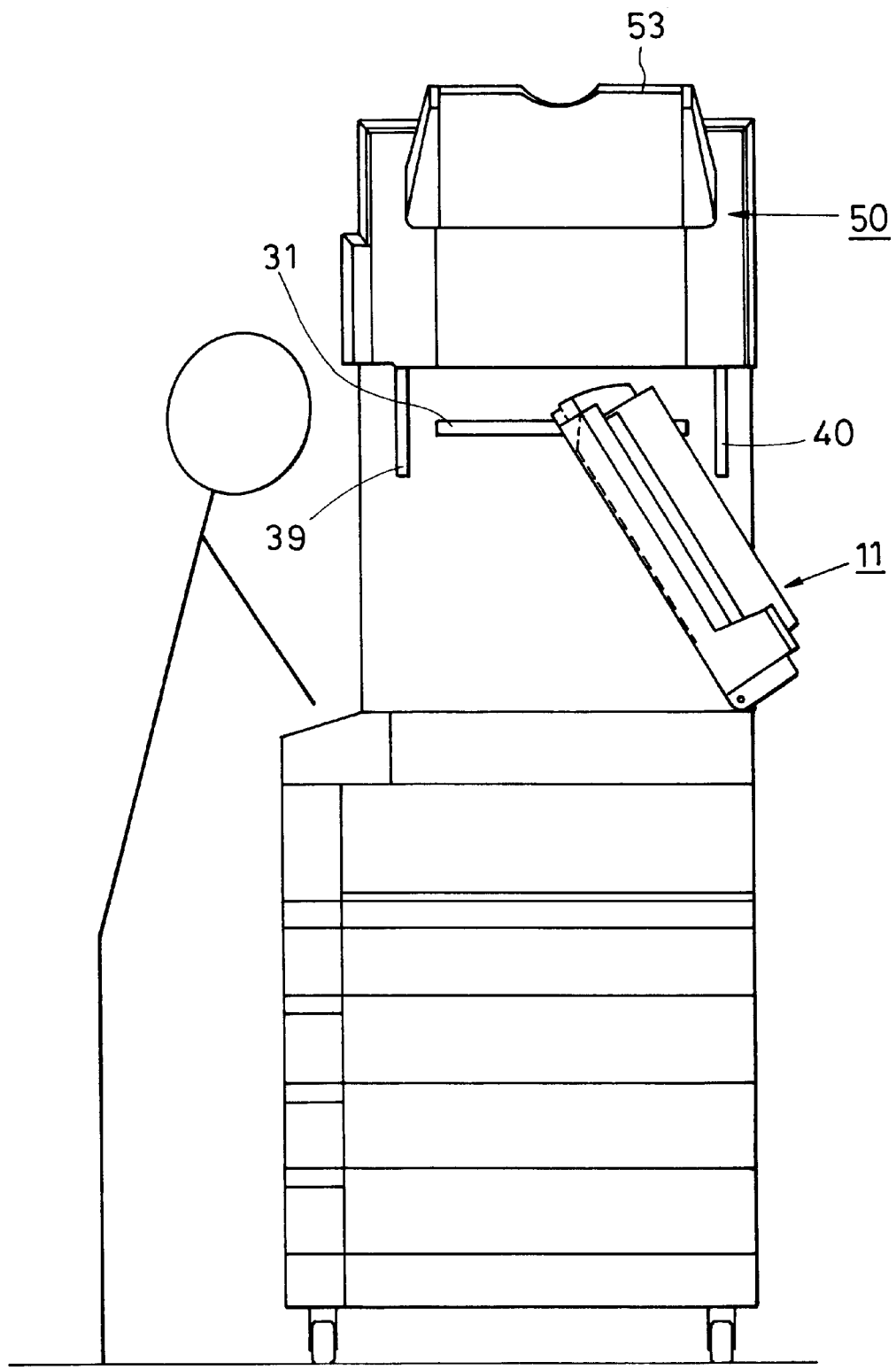
FIG. 4 is a drawing when viewing in the direction B of FIG. 3.

Referring to FIGS. 1, 3, and 4, the operation of the finisher 50 will be described based on the structure described above.

In the state shown in FIG. 1, when a user turns a finisher-displacement switch (not shown) on so as to open the ADF 11, the rotation of the finisher-displacing motor 35 is started. Following this, the driving chain 36 is rotated so that the finisher 50 fixed to the chain starts the upward displacement.

FIGS. 3 and 4 are drawings showing the state of completion of the displacement of the finisher 50. FIG. 4 is a drawing of the apparatus when viewed in the direction of the arrow B shown in FIG. 3.

As shown in FIG. 3, the finisher 50 is displaced to the opening 37, so that a sheet with an image formed thereon can be fed from the conveying path 45 to the finisher 50.

In addition, as mentioned above, the flapper 34 of the conveying path 45 is displaced so as to switch the conveying path of a sheet corresponding to the movement of the finisher 50. When the finisher 50 is moved from the opening 32 to the opening 37 (upwardly), the flapper 34 is displaced to the position shown in FIG. 3.

As shown in FIGS. 3 and 4, the ADF 11 can be upwardly rotated owing to the displacement of the finisher 50, enabling the document-placing table 10 to be opened. Thereby, a document, which is impossible to utilize the automatic document feeding function of the ADF 11, can be satisfactorily read.

In addition, the vertical movement timing and the initial position of the finisher 50 can be arbitrarily set by a user. For example, when the apparatus is installed in circumstances wherein copying is performed on sheet documents mainly rather than on book documents or the apparatus is principally utilized as the printer output and the facsimile reception, the finisher 50 can be originally set at the position shown in FIG. 1.

In such setting, when the ADF 11 is opened, the finisher 50 is upwardly displaced; when the ADF 11 is again closed upon completion of a copying job, it is controlled that the finisher 50 is downwardly moved so that a sheet on the finisher-discharging tray 53 can be easily taken out.

In the above description, a user operates the switch (not shown) so as to move the finisher 50; however, the finisher 50 may be automatically moved by a mechanism wherein a sensor is arranged for detecting opening and closing operations of the ADF 11 performed by a user.

On the other hand, in circumstances wherein copying is mainly performed on book documents, the finisher 50 is arranged at the position shown in FIG. 3, and when a printing or facsimile reception signal is transferred thereto, it may be controlled that the finisher 50 is moved to the position shown in FIG. 1.

When a sheet document is read and a desired processing is performed thereon by using the ADF 11, the processing is performed at the position shown in FIG. 3, and it may be controlled that upon completion of the entire job, the finisher 50 is downwardly moved so as to enable the easy taking-out of a sheet on the finisher-discharging tray 53 to be enhanced.

In the absence of options such as pedestals as placing tables for the paper cassette and the apparatus, the height of the apparatus is to be lower. When a user's height is higher, the height of the apparatus also is relatively low. Based on these cases, when the finisher 50 is placed at the position shown in FIG. 3, it is also controllable that without the movement of the finisher 50, the finisher-discharging tray 53 only is lowered so as to enable the easy taking-out of a sheet. Thereby, the visual recognition and the easy taking-out of a sheet can be enhanced in a shorter time than that for the movement of the finisher 50.

Furthermore, the following controls are capable by arranging a sheet-presence-detecting sensor (not shown) for detecting the presence of a sheet discharged on the finisher-discharging tray 53.

Suppose that a predetermined processing is performed on a sheet at the position shown in FIG. 3 so as to pile it up on the discharging tray 53 and then the finisher 50 is lowered.

When a user removes a sheet from the tray 53 in the middle of the movement of the finisher 50, a controller (not shown) for controlling the apparatus by the output from the presence-detecting sensor can control the finisher 50 so as to stop it and move it upwardly again without lowering it to the lowest position, thereby preventing the wasteful movement of the apparatus, resulting in improvement of electrical energy saving and operability.

In this structure, since the conveying distance of the conveying path 45 from the image forming section to the finisher 50 is large, it is controlled that the sheet feeding velocity in the conveying path 45 is increased relative to that in the image forming section. The reduction in throughput is thereby prevented.

In cases wherein the processing with the finisher 50 is not required; a small number of sheets are outputted; the output of a sheet is required to make haste; and so forth, of course the sheet can be discharged to the normal discharging section 8.

Next, another embodiment according to the present invention will be described with reference to the drawings. In addition, like reference characters designate like portions having functions common to those of the above-described embodiment, and description thereof is omitted. The description of the general image forming operations is also omitted.

Figure 5:
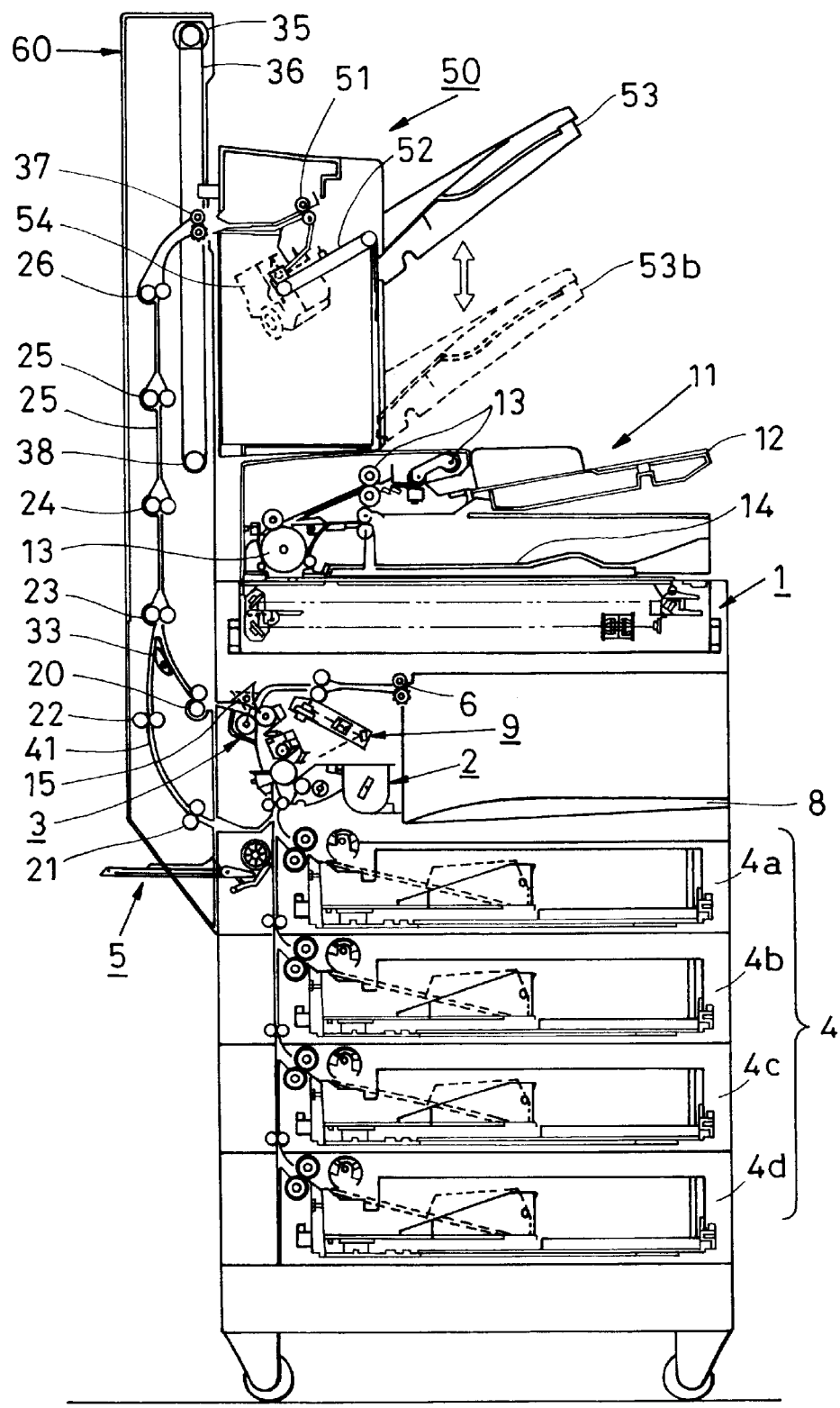
FIG. 5 is a schematic front view of an image forming apparatus according to another embodiment of the present invention.

FIG. 5 shows an image forming apparatus having the finisher 50 in an upper portion above the ADF 11 shown in the above-described embodiment. The arrangement of the entire structure of the apparatus is the same as that of the above-described apparatus.

In addition, a conveying path 60 in this embodiment is of a type having one opening. However, the finisher 50 is formed movably in the vertical direction along the conveying path 60 just like the above description. The mechanism of the movement is identical thereto, so that description thereof is omitted.

In the embodiment, the method for reading a sheet document so as to copy it by using the ADF 11 is identical with that of the first embodiment. The feature of the. embodiment is a method for reading a book document for which it is impossible to use the ADF 11 in the apparatus.

Figure 6:
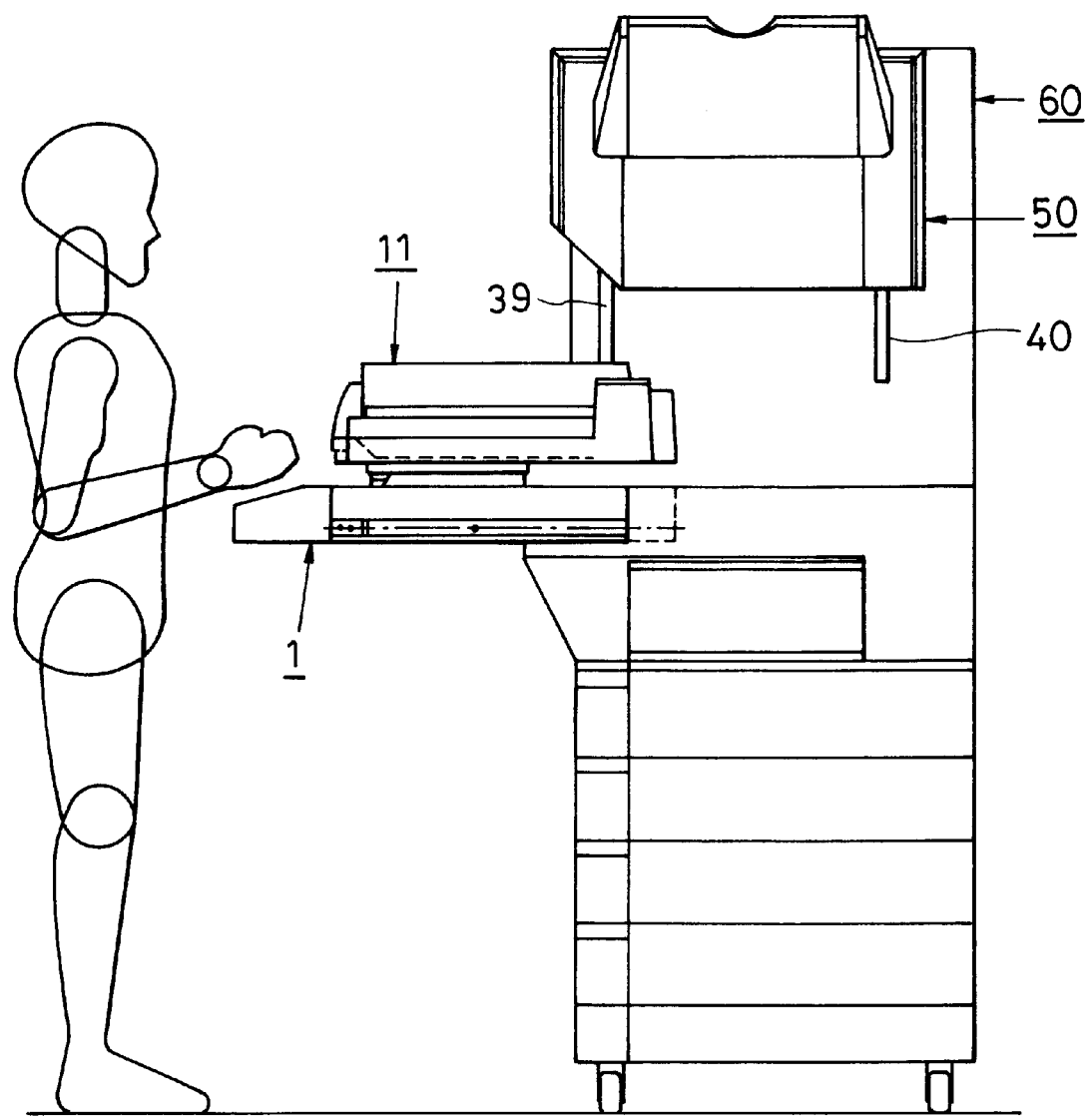
FIG. 6 is a side view of the image forming apparatus according to the second embodiment in which a document reader is pulled out to the front side of the apparatus.

As shown in FIG. 6, the image reading section 1 in the apparatus is capable of being drawn out toward an operator by utilizing a sliding mechanism (not shown). The operation of copying a book document by using this structure will be described.

Figure 7:
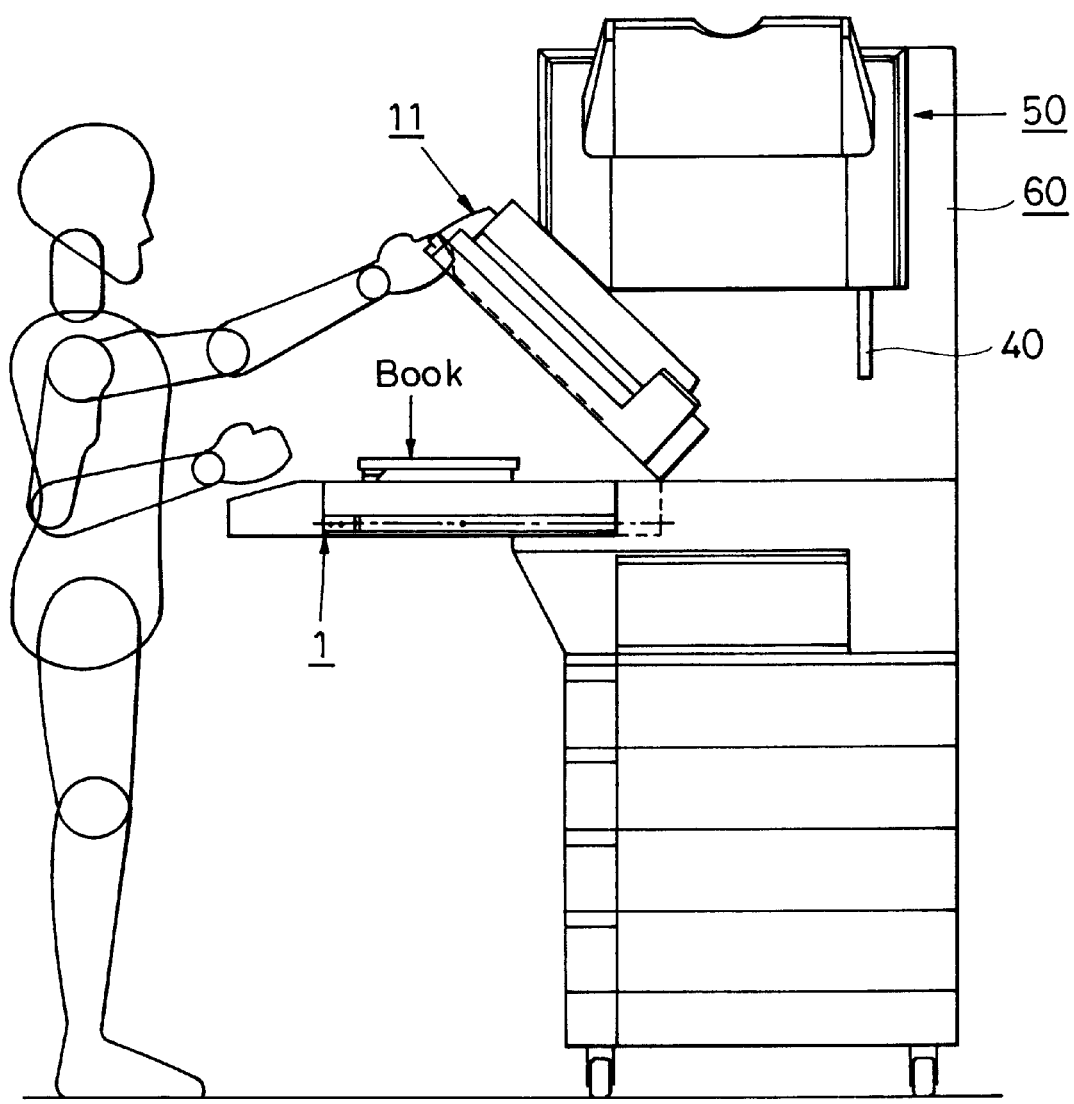
FIG. 7 is a side view of the image forming apparatus according to the second embodiment in which an automatic document feeder is open.

In order to copy a book document, an operator draws out the image reading section 1 at first. The drawn state of the image reading section 1 is detected by a positional sensor (not shown) so that the finisher 50 is moved upwardly based on the detected signal. Thereby, as shown in FIG. 7, a sufficient space for placing a book document on the document-placing table 10 can be obtained by upwardly rotating the ADF 11. Accordingly, the operator can place a book document on the document-placing table 10 and press it by closing the ADF 11, enabling the image reading operation to be easily performed. In addition, the reading operation is possible in any one of drawn and retracted states of the image reading section 1.

The read image information is stored in a memory (not shown). When the image reading section 1 is retracted to the initial position (position shown in FIG. 5) upon completion of a predetermined reading operation, the positional sensor detects the operation and sends a signal to the controller. Corresponding to the signal, the image forming operation is started so as to perform the image formation based on the document image information stored in the memory. A sheet with the image formed thereon is discharged on the normal discharging section 8 or the finisher-discharging tray 53 of the finisher 50 which is moved to the position shown in FIG. 5 by a signal of the positional sensor after a predetermined processing performed thereon.

Even with a book document, when the discharging to the normal discharging section 8 is selected, the copying without storing image information in the memory is also possible.

The operation described above is the image formation according to the embodiment. By drawably holding the image reading section 1 relative to the apparatus body, the reading of a sheet document, a thick sheet document, and a book document can be readily performed.

In comparison with the first embodiment, the document-placing table 10 can be opened after drawing out the image reading section 1, so that the height of the conveying path 60 can be reduced.

In addition, the sliding mechanism of the image reading section 1 may be of any type such as one using a rail or a roller as long as it is movable.

Then, still another embodiment according to the present invention will be described in detail with reference to the drawings. In addition, like reference characters designate like portions having functions common to those of the above-described two embodiments, and description thereof is omitted. The description of the general image forming operations is also omitted.

Figure 8:
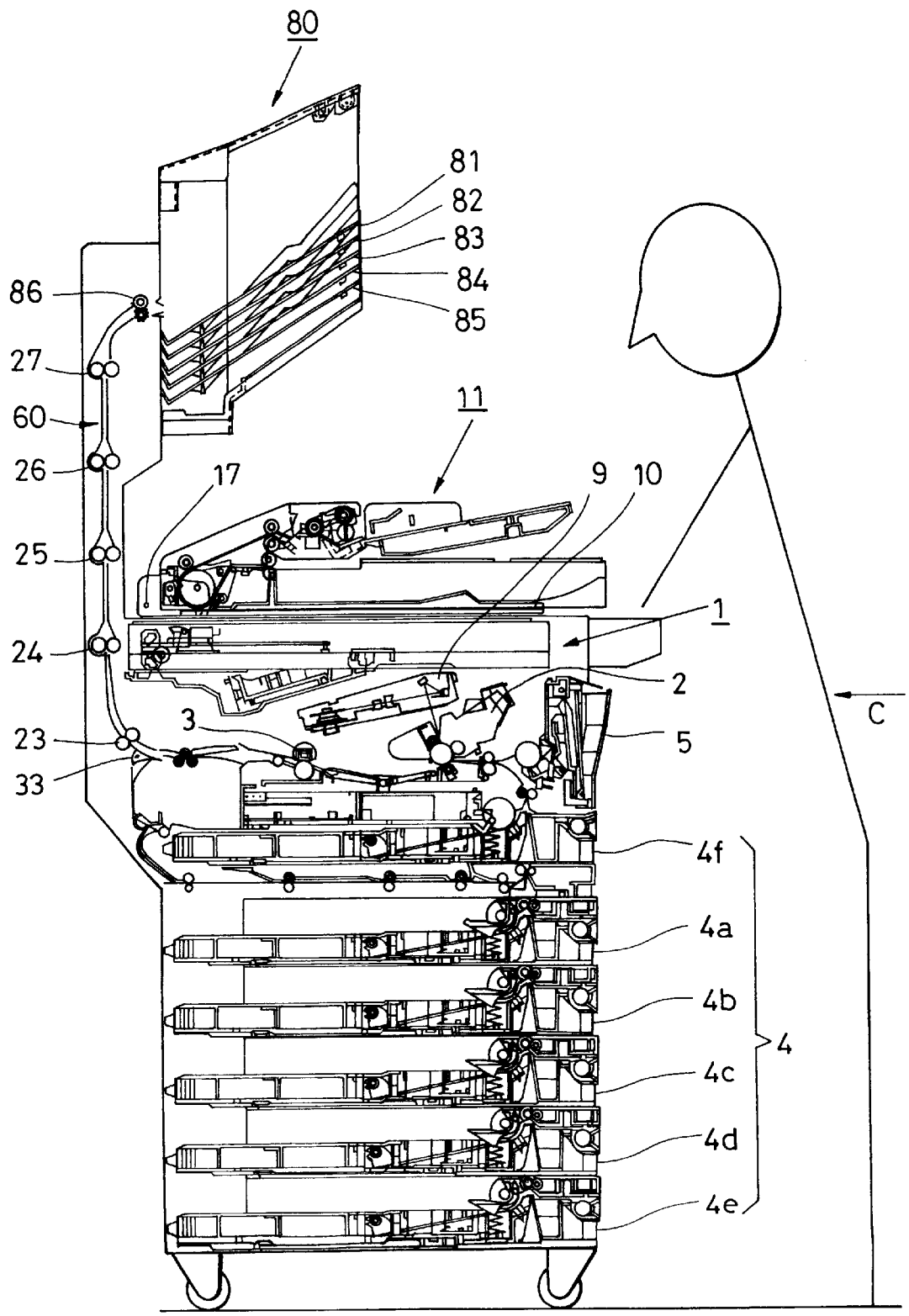
FIG. 8 is a schematic side view of an image forming apparatus according to still another embodiment of the present invention.
Figure 9:
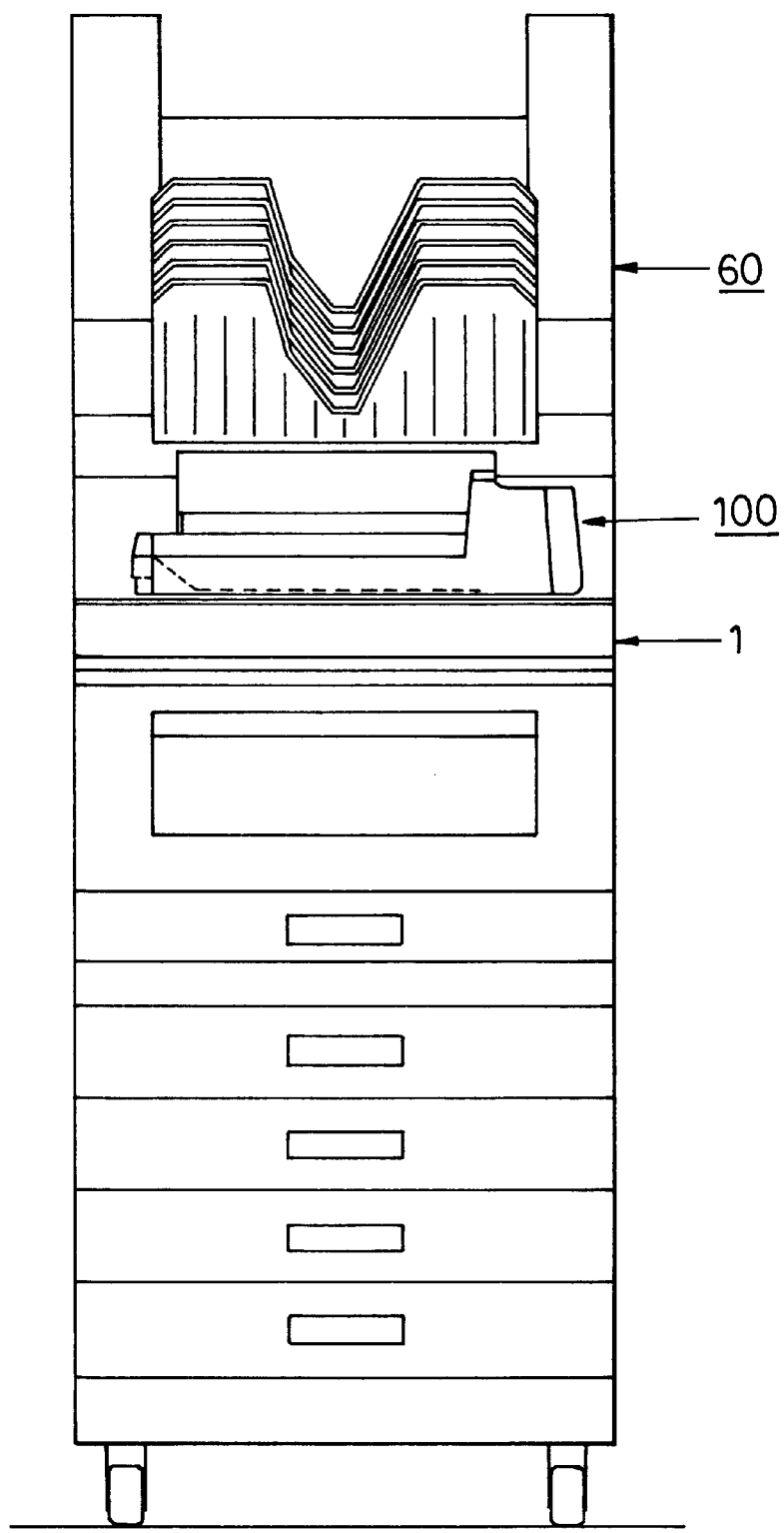
FIG. 9 is a drawing when viewing in the direction C of FIG. 8.

A processing device attached to a copying machine as an image forming apparatus shown in FIG. 8 and FIG. 9, which is a drawing when viewing the apparatus in the direction indicated by the arrow C of FIG. 8, is of a sorter type having plural trays.

As shown in FIG. 8, the operating direction of the apparatus is opposite to the sheet-discharging direction of the processing device. The sheet-feeding direction in the image forming section is horizontal while being vertical in the first and the second embodiment (image formation is performed while a sheet is transferred in the substantially vertical direction). The manual-feeding-sheet piling unit 5 is arranged in the operator side.

The automatic document feeder 11 (ADF) is constructed so as to feed a document from the foreground toward the background when viewing from the operator side shown in FIG. 8. Therefore, the scanning direction for reading a document is from the background of the apparatus toward the foreground (operator side).

A sheet with an image formed thereon is transferred through the inside of the conveying path 60 disposed in the inner part of the apparatus so as to be fed to a sorter 80 which is a processing device. The sorter 80 is provided with plural trays 81, 82, 83, 84, and 85 so as to enable sheets having images formed thereon to be sorted. These trays can be moved relative to a sorter-discharging section 86 by a tray driving mechanism (not shown), enabling a sheet to be received on an arbitrary tray. Also, sheets discharged on the tray can be adjusted by a jogger bar (not shown), etc.

Next, in the apparatus, the image reading operation for a book document by upwardly rotating the ADF 11 so as to open the document-placing table 10 will be described.

An operator operates an operating switch (not shown) so as to open the ADF 11 just like in the first embodiment. Thereby, each of the trays 81, 82, 83, 84, and 85 of the sorter is upwardly moved by the tray driving mechanism (not shown).

Figure 10:
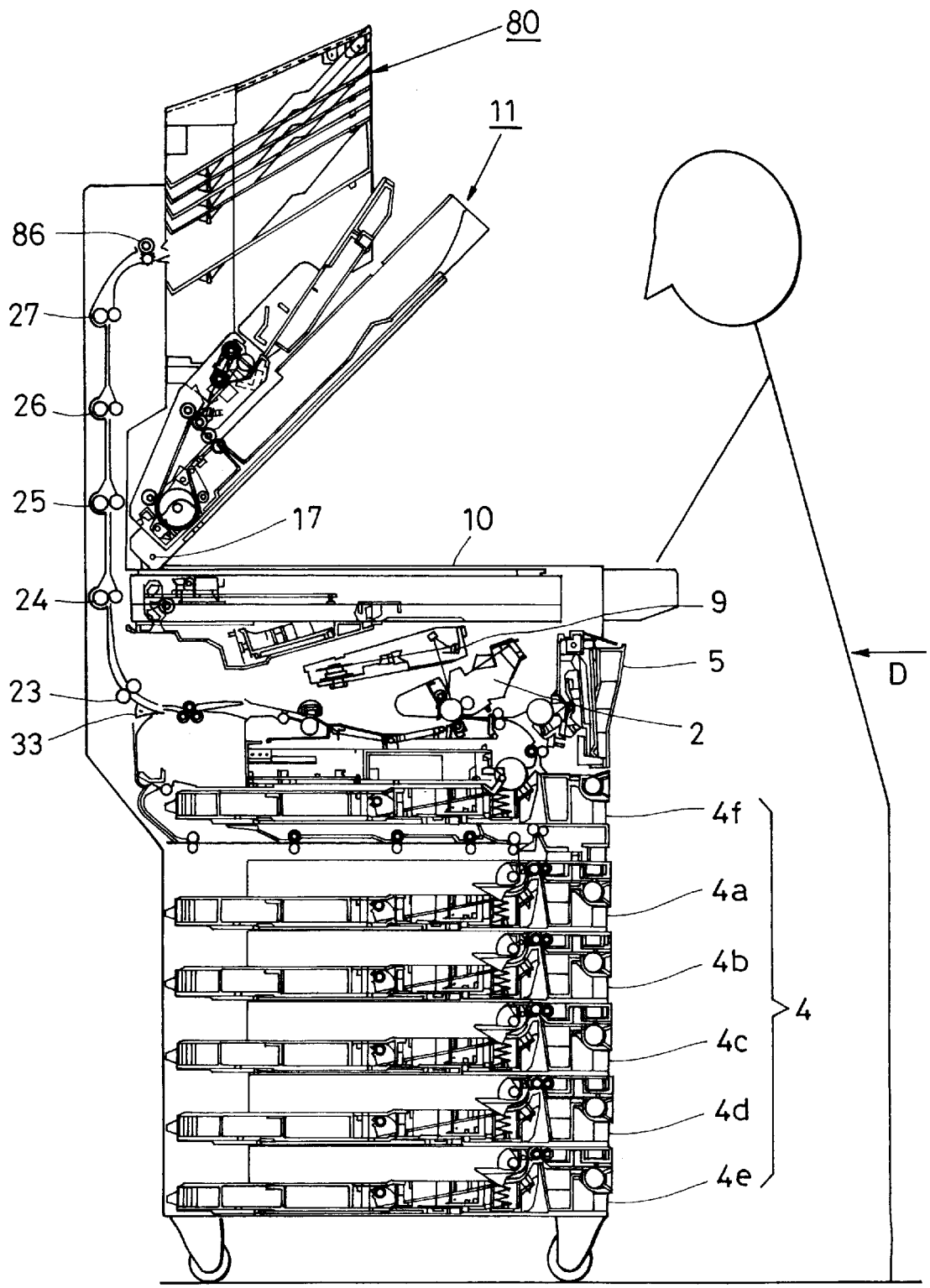
FIG. 10 is a side view of the image forming apparatus according to the third embodiment in which an automatic document feeder is open.
Figure 11:
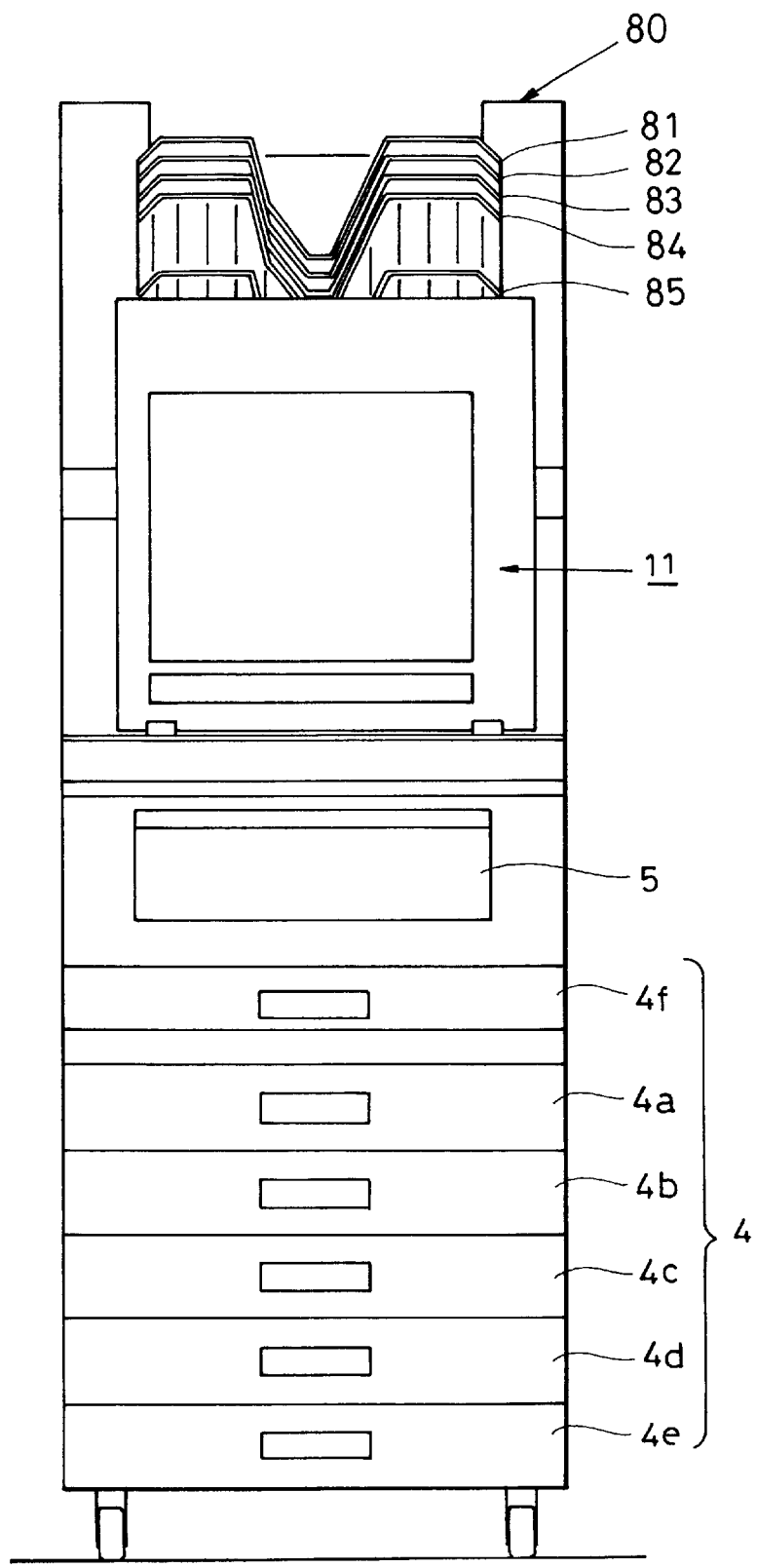
FIG. 11 is a drawing when viewing in the direction D of FIG. 10.
Figure 12:
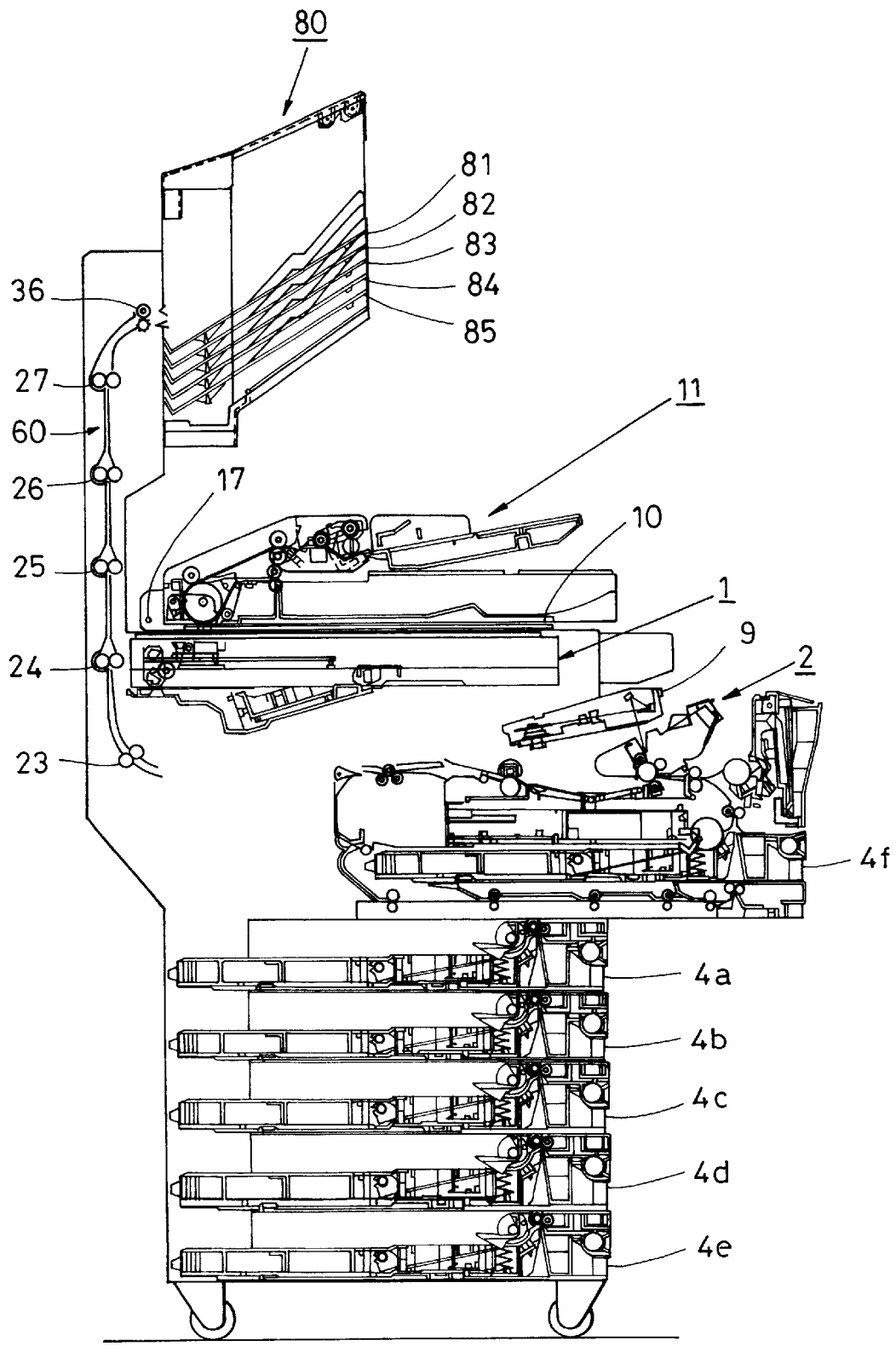
FIG. 12 is a side view of the image forming apparatus according to the third embodiment in which an image former is pulled out.

FIG. 10 shows an opened state of the ADF 11 utilizing a space on the ADF 11 expanded by the upward movement of the trays of the sorter. FIG. 11 is a drawing of the apparatus when viewing it in the direction of the arrow D of FIG. 10 (from an operator). The ADF 11 is located below the elevated trays and does not make contact with them. Then, an operator places a document on the document-placing table 10; closes the ADF 11; and presses a copy button (not shown), so that the image forming operation is started. The subsequent image forming operation is the same as that described already, so that the description thereof is omitted.

A sheet discharged on each tray of the sorter 80 is positionally adjusted by the jogger bar (not shown) and stapled on demand. Upon completion of the entire job, an operator takes out the sheet from the tray; also takes the document out by opening the ADF 11; and closes the ADF 11 again.

After completion of these operations, each tray of the sorter 80 is retracted to the normal position shown in FIG. 8.

The reading operation for a book document has been described as above; when the ADF 11 is opened and closed, sorting is controlled so that a sheet is stacked on a tray sequentially from the lower tray of the trays (in the state of FIG. 10, stacked from the tray 85).

In the copying in which the ADF 11 is not opened and closed, the printer output, the facsimile reception, and so forth, sorting is controlled so that a sheet is stacked on a tray sequentially from the upper tray of the trays (in the state of FIG. 8, stacked from the tray 81). This is important in view of the operability for users.

Since the apparatus is constructed so as to transfer a sheet from the operator side toward the inner part, when a problem such as sheet jamming occurs during the transferring, the image forming section, a top paper feeding cassette 4f, the double-sided-copy conveying path, and the manual-feeding-sheet piling unit 5 can be integrally drawn toward an operator, thereby enabling the maintenance of the image forming section and the jamming retrieval to be easily performed.

The image forming apparatus according to the embodiment may be provided with the mechanism described in the other embodiments, in which the image reading section 1 is drawn toward an operator so as to open and close the ADF 11.

Figure 13:
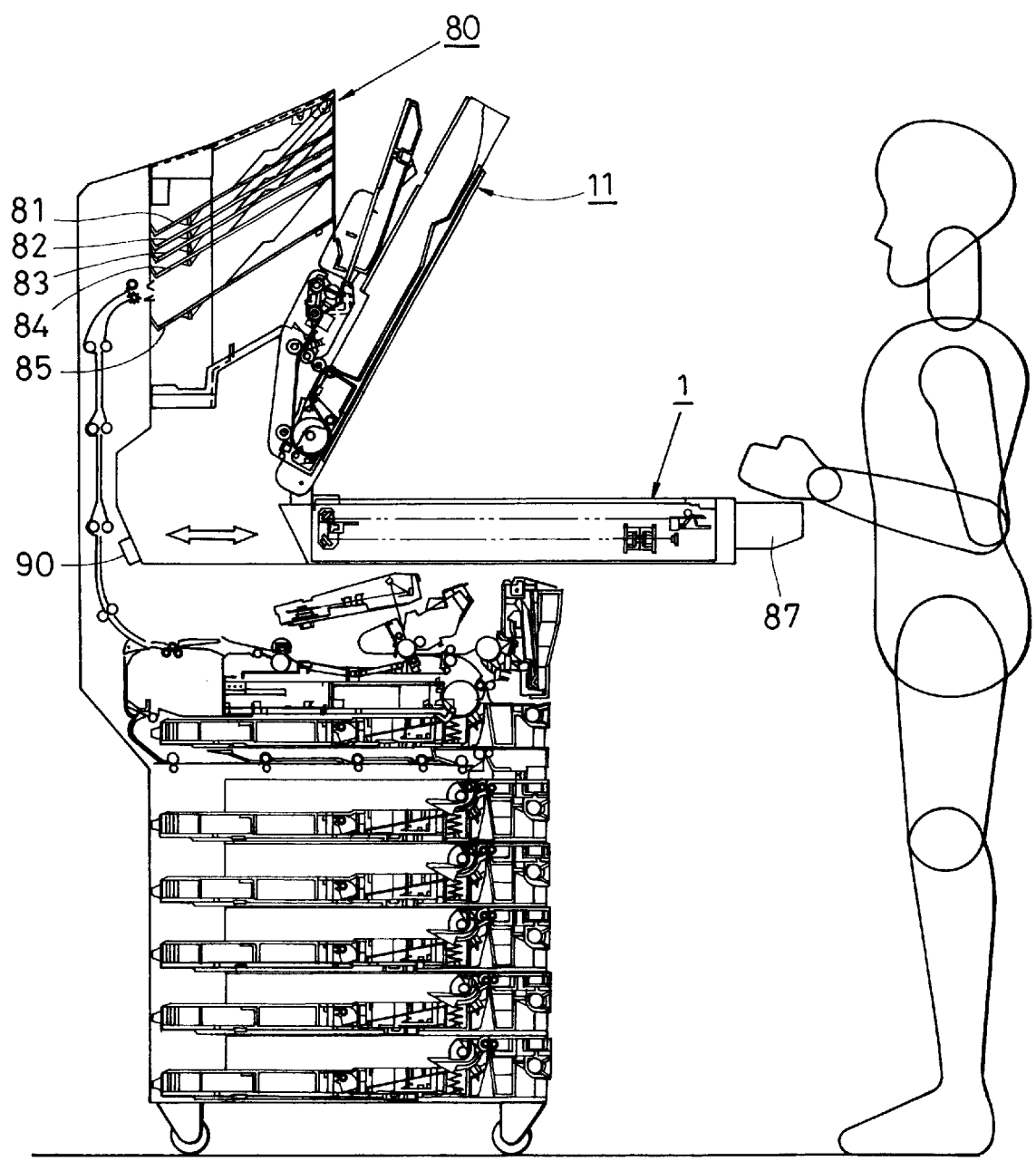
FIG. 13 is a side view of the image forming apparatus according to the third embodiment in which the automatic document feeder is pulled out toward the foreground of the apparatus and opened.
Figure 14:
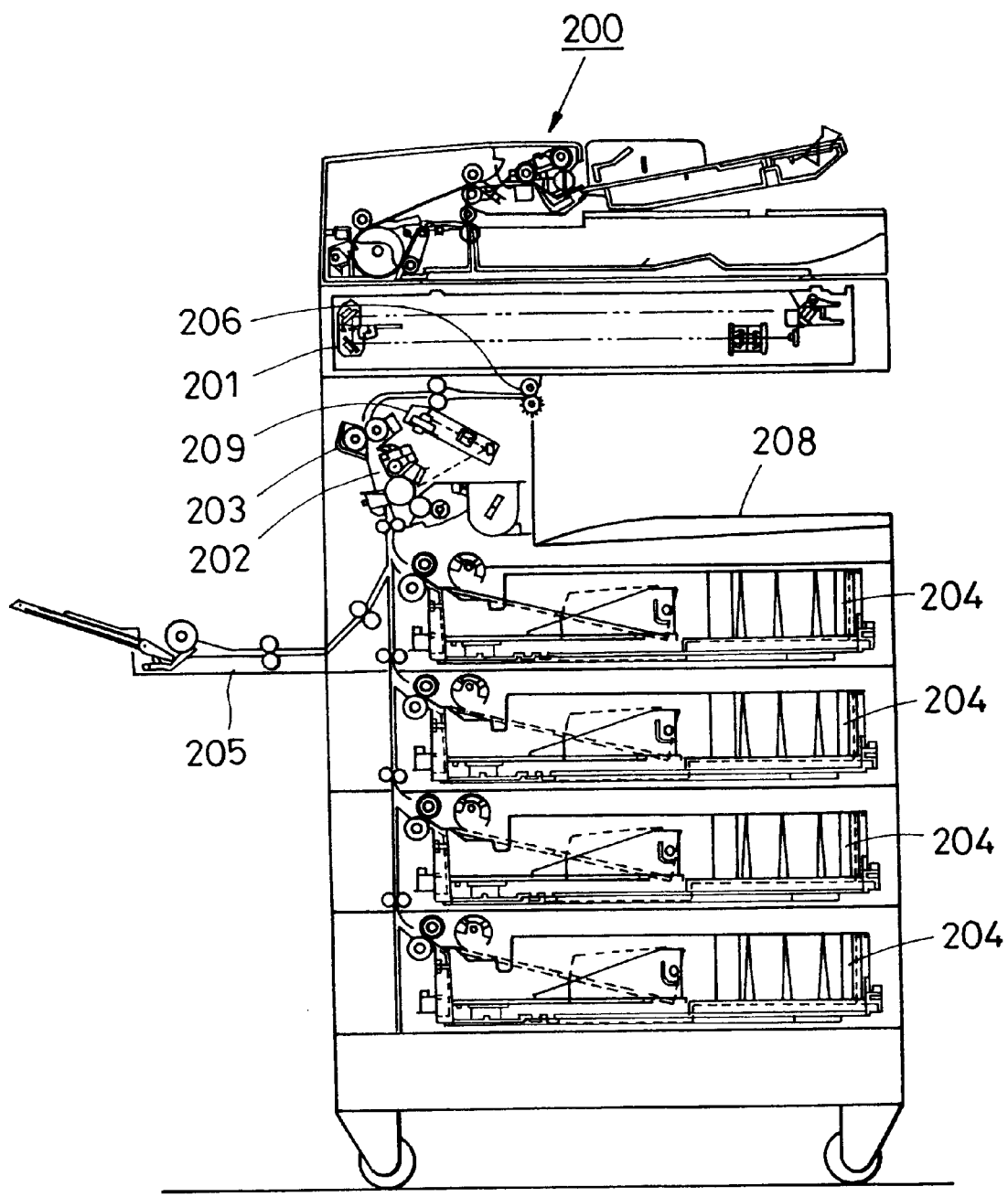
FIG. 14 is a schematic front view of a conventional image forming apparatus.
Figure 15:
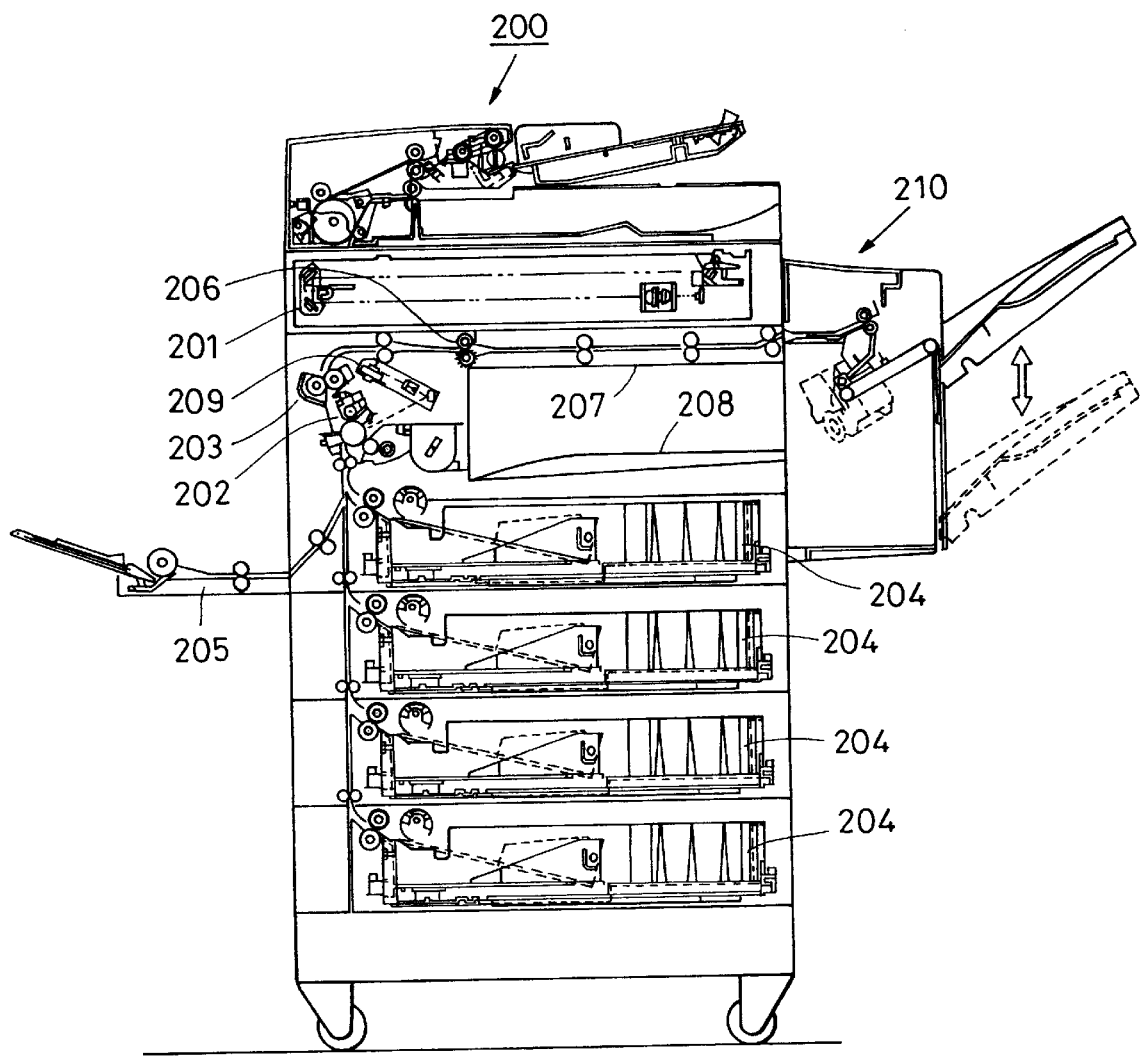
FIG. 15 is a schematic sectional view of the image forming apparatus shown in FIG. 14 with a processing device attached thereto.

FIG. 13 shows an opened state of the document-placing table 10 by rotating the ADF 11 after drawing out the drawably constructed image reading section 1 of the image forming apparatus shown in FIG. 8.

The drawing mechanism of the image reading section 1 is identical to that in the other embodiment described above, so the description thereof is omitted.

The drawing operation of the image reading section 1 is detected by a positional sensor 90. Based on the detected signal, trays of the sorter 80 are upwardly moved so as to expand a space in order to facilitate the opening and closing of the ADF 11. Thereby, the ADF 11 can be easily rotated upwardly after drawing the image reading section 1.

The image information, which is read in the reading section 1, is stored in a memory just like in the second embodiment so that the image reading operation is completed. When the drawn-out image reading section 1 is retracted to the initial position, the sensor 90 detects the state so that the image forming operation is started by the detected signal.

Upon completion of a predetermined job, the trays are moved downwardly so as to facilitate taking out a sheet by an operator. Accordingly, the image-reading operation of a thick sheet document or a book document can be satisfactorily performed.

As described in this embodiment, an operator can perform the entire job from one way by using such a structure. Therefore, the image forming apparatus body can be installed so that three sides of the body, which are rear, right, and left sides, are contact with walls, resulting in space saving and high copying productivity as well in a system having the automatic document feeder and the processing device.

In addition, the processing device is provided with the sorter in the embodiment; the finisher described in the first and second embodiments may be arranged. Also, the discharging within the apparatus type of image forming apparatus may be substituted for the image forming apparatus shown in this embodiment. In this case, the sheet discharging within the apparatus is directed from the inner part toward an operator.

The present invention has been described in detail according to the three embodiments. By embodying the present invention, space saving can be compatible with high copying productivity, so that the problem of a conventional image forming apparatus is solved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:
    a sheet supporter adapted to hold a sheet on which an image is to be formed;
    an image former disposed above said sheet supporter for forming an image on a sheet;
    a document reader disposed above said image former and having a document placing table on which a document is placed, wherein said document reader scans image information of the document;

an automatic document feeder disposed above said document reader for feeding a document to said document reader, wherein said automatic document feeder is displaceable so as to allow placement of the document on said document placing table of said document reader;

a sheet discharging section on which a sheet with an image formed thereon by said image former is discharged and stacked, said sheet discharging section disposed above said automatic document feeder; and a transferring section for moving a sheet with an image formed thereon by said image former to said sheet discharging section, wherein said sheet discharging section is capable of moving upward so as to allow said automatic document feeder to be displaced when a document is placed on said document placing table.

2. An image forming apparatus according to claim 1, wherein said sheet discharging section performs a predetermined process on the sheet with an image formed thereon by said image former.

3. An image forming apparatus according to claim 2, wherein a sheet discharging tray of said sheet discharging section, on which the sheet with the predetermined process performed thereon is discharged, is vertically movable.

4. An image forming apparatus according to any one of claims 1 to 3, wherein said sheet discharging section is moved vertically by a motor disposed in said transferring section.

5. An image forming apparatus according to claim 1, wherein said transferring section is provided with a plurality of openings within the moving range of said sheet discharging section for delivering a sheet from said transferring section to said sheet discharging section.

6. An image forming apparatus according to claim 5, wherein said sheet discharging section is locatable as an initial position at any one of the plurality of openings formed in said transferring section.

7. An image forming apparatus according to claim 1, further comprising a sensor that senses displacement of said automatic document feeder, wherein said sheet discharging section is moved based on a sensed displacement of said automatic document feeder.

8. An image forming apparatus according to claim 1, wherein said sheet discharging section has a plurality of trays, wherein said sheet discharging section is controlled such that a sheet is stacked in a tray of said plurality of trays sequentially from an upper tray when said document feeder covers said document placing table; and wherein when said document feeder is displaced from said document placing table, said sheet discharging section is controlled such that a sheet is stacked on a tray of said plurality of trays sequentially from a lower tray.

9. An image forming apparatus according to claim 1, wherein a sheet transferring speed in said transferring section is faster than movement of the sheet in said image former.

10. An image forming apparatus according to claim 1, further comprising discharging rollers for discharging a sheet on which an image is formed by said image former between said document reader and said image former.

11. An image forming apparatus comprising:

a sheet feeding cassette adapted to hold at least one sheet on which an image is to be formed;

a photosensitive drum for forming an image on a sheet and disposed above said sheet feeding cassette;

a document reader disposed above said photosensitive drum and having a document placing table on which a document is placed in order to read image information from the document;

a document feeder for feeding a document to said document reader, said document feeder disposed above said document reader and displaceable so as to allow placement of the document on said document placing table of said document reader;

a conveying path for guiding the sheet on which an image is formed by said photosensitive drum; and a tray on which the sheet guided by said conveying path is stacked;

wherein said tray is capable of moving upward so as to allow said automatic document feeder to be displaced when a document is placed on said document placing table.

12. An image forming apparatus according to claim 11, further comprising a second tray on which the sheet guided by said conveying path is stacked, wherein said second tray is capable of moving upward so as to allow said automatic document feeder to be displaced when a document is placed on said document placing table.

13. An image forming apparatus according to any one of claims 11 and 12, wherein a sheet transferring speed in said conveying path is faster than a sheet transferring speed when an image is being formed on said sheet.

14. An image forming apparatus according to claim 11, further comprising discharging rollers for discharging a sheet on which an image is formed by said photosensitive drum, between said document reader and said image former.

* * * * *

UNITED STATES PATENT AND TRADEMARK OFFICE
CERTIFICATE OF CORRECTION

PATENT NO.   : 6,522,862 B2
DATED        : February 18, 2003
INVENTOR(S)  : Yoshiyuki Koshimizu et al.

It is certified that error appears in the above-identified patent and that said Letters Patent is hereby corrected as shown below:

<u>Column 7,</u>
Line 63, "the." should read -- the --.

Signed and Sealed this

Sixteenth Day of September, 2003

JAMES E. ROGAN
*Director of the United States Patent and Trademark Office*